US012341818B2

(12) United States Patent
Adharapurapu et al.

(10) Patent No.: US 12,341,818 B2
(45) Date of Patent: Jun. 24, 2025

(54) HIERARCHICAL POLICY-BASED DECISION FRAMEWORK FOR CLOUD-NATIVE TELECOMMUNICATION SYSTEMS

(71) Applicant: Rakuten Symphony, Inc., Tokyo (JP)

(72) Inventors: Krishna Pramod Adharapurapu, Bangalore (IN); Nagendra Bykampadi, Bangalore (IN); Satish Balagopalan, Banglaore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 17/918,768

(22) PCT Filed: Aug. 2, 2022

(86) PCT No.: PCT/US2022/039105
§ 371 (c)(1),
(2) Date: Oct. 13, 2022

(87) PCT Pub. No.: WO2023/204833
PCT Pub. Date: Oct. 26, 2023

(65) Prior Publication Data
US 2024/0223608 A1    Jul. 4, 2024

(30) Foreign Application Priority Data
Apr. 19, 2022    (IN) .............................. 202241022873

(51) Int. Cl.
*H04L 9/40* (2022.01)
*G06F 8/65* (2018.01)
(Continued)

(52) U.S. Cl.
CPC ................ *H04L 63/20* (2013.01); *G06F 8/65* (2013.01); *H04L 63/101* (2013.01)

(58) Field of Classification Search
CPC ......... H04L 63/20; H04L 63/101; G06F 8/65; G06F 2221/2145; G06F 21/552; G06F 21/62; G06F 11/1433
See application file for complete search history.

(56) References Cited

U.S. PATENT DOCUMENTS 9,467,448 B2 * 10/2016 Kotani .................... H04L 63/10
2008/0184336 A1 * 7/2008 Sarukkai ............. G06F 21/6218
726/1

(Continued)

OTHER PUBLICATIONS

International Search Report dated Dec. 6, 2022 issued by the International Searching Authority in Application No. PCT/US22/39105.

(Continued)

*Primary Examiner* — Darren B Schwartz
(74) *Attorney, Agent, or Firm* — Sughrue Mion, PLLC (57) ABSTRACT

A method of policy decision includes receiving, by a central policy server, a network policy, determining, by a cluster policy server that is separate from the central policy server, whether the network policy is relevant to a cluster corresponding to the cluster policy server, storing, by the cluster policy server, the network policy in a cluster policy database based on determining that the network policy is relevant to the cluster corresponding to the cluster policy server, obtaining, by a policy decision point (PDP) module that is separate from the cluster policy server, the network policy stored in the cluster policy database, and determining, by the PDP module, whether to implement the network policy based on a policy query received from a policy enforcement point (PEP) module.

20 Claims, 6 Drawing Sheets

(51) Int. Cl.
*G06F 11/14* (2006.01)
*G06F 21/55* (2013.01)
*G06F 21/62* (2013.01)

(56) References Cited

U.S. PATENT DOCUMENTS

| | | | | |
|---|---|---|---|---|
| 2009/0113514 A1* | 4/2009 | Hu | H04L 65/1066 | 726/1 |
| 2009/0175215 A1* | 7/2009 | Chen | H04W 76/12 | 370/328 |
| 2011/0314261 A1* | 12/2011 | Brucker | G06F 21/6218 | 712/E9.055 |
| 2013/0198799 A1* | 8/2013 | Staggs | H04L 63/105 | 726/1 |
| 2013/0283338 A1* | 10/2013 | Kumar | H04L 63/20 | 726/1 |
| 2014/0304769 A1* | 10/2014 | Chua | H04L 63/20 | 726/1 |
| 2015/0026765 A1* | 1/2015 | Durie | H04L 63/205 | 726/1 |
| 2015/0120898 A1* | 4/2015 | Sherman | H04L 41/0893 | 709/223 |
| 2016/0014140 A1* | 1/2016 | Akireddy | H04L 63/20 | 726/1 |
| 2018/0302443 A1* | 10/2018 | Weiss | G06F 21/604 | |
| 2018/0367412 A1 | 12/2018 | Sethi et al. | | |
| 2020/0244704 A1 | 7/2020 | Andrews et al. | | |
| 2021/0006596 A1* | 1/2021 | Beredimas | H04L 63/20 | |
| 2021/0173952 A1 | 6/2021 | Raphael et al. | | |
| 2022/0012340 A1 | 1/2022 | Rao et al. | | |
| 2022/0086025 A1* | 3/2022 | Tewari | H04L 41/0803 | |
| 2022/0329603 A1* | 10/2022 | Gujar | H04L 63/104 | |

OTHER PUBLICATIONS

Written Opinion dated Dec. 6, 2022 issued by the International Searching Authority in Application No. PCT/US22/39105.

* cited by examiner

HIERARCHICAL POLICY-BASED DECISION FRAMEWORK FOR CLOUD-NATIVE TELECOMMUNICATION SYSTEMS

CROSS-REFERENCE TO RELATED APPLICATION(S)

This application is a National Stage of International Application No. PCT/US2022/039105, filed on Aug. 2, 2022 and claims priority to Indian Provisional Application No. 20/224,1022873, filed on Apr. 19, 2022, the disclosures of which is are incorporated by reference herein in their entireties.

BACKGROUND

1. Field

Apparatuses and methods consistent with example embodiments of the present disclosure relate to cloud-native systems, and more specifically to a method and system for hierarchical policy-based decision framework for cloud-native telecommunication systems.

2. Description of Related Art

There are various policy frameworks where a hierarchy of policies is defined and policy decisions are made at a central policy server based on this hierarchy of policies. Furthermore, different devices (e.g., edge network routers, switches, nodes, etc.) may be arranged in a hierarchy in order to inherit policies from a parent device(s) (e.g., core network routers, switches, nodes, etc.). However, various problems exist, such as the lack of functional separation of policy enforcement points (PEP) and policy decision points (PDP) for a distributed cloud-native system.

Furthermore, a central policy server may be overwhelmed by the different policy decision requests coming from the distributed microservices and network traffic may also increase to the central policy server. The number of network hops between the policy decision point and a policy enforcement point defines a speed of decision making and execution of an application acting as the policy enforcement point. As the number of network hops increases, packet loss events and packet jitter increase, causing unreliable and unpredictable decision making at the policy enforcement point. The policy decision process does not take into consideration the current state of the PEP and its dependencies. Due to network bandwidth and delay issues involved in updating state information, it is difficult and unviable to push the state information of all the PEPs to the central policy server or a non-co-located PDP.

SUMMARY

According to embodiments, systems and methods are provided for a hierarchical policy-based decision framework for cloud-native telecommunication systems.

According to an aspect of the disclosure, a method of policy decision making may include receiving, by a central policy server, a network policy, determining, by a cluster policy server that is separate from the central policy server, whether the network policy is relevant to a cluster corresponding to the cluster policy server, storing, by the cluster policy server, the network policy in a cluster policy database based on determining that the network policy is relevant to the cluster corresponding to the cluster policy server, obtaining, by a policy decision point (PDP) module that is separate from the cluster policy server, the network policy stored in the cluster policy database, and determining, by the PDP module, whether to implement the network policy based on a policy query received from a policy enforcement point (PEP) module.

According to an aspect of the disclosure, a system for policy decision making may include a central policy server configured to receive a network policy, and a cluster policy server that is separate from the central policy server and is configured to determine whether the network policy is relevant to a cluster corresponding to the cluster policy server, and store the network policy in a cluster policy database based on determining that the network policy is relevant to the cluster corresponding to the cluster policy server, and a PDP module that is separate from the cluster policy server and is configured to obtain the network policy stored in the cluster policy database and determine whether to implement the network policy based on a policy query received from a PEP module.

According to an aspect of the disclosure, a non-transitory computer-readable storage medium may store instructions that, when executed by at least one processor, cause the at least one processor to receive, by a central policy server, a network policy, determine, by a cluster policy server that is separate from the central policy server, whether the network policy is relevant to a cluster corresponding to the cluster policy server, store, by the cluster policy server, the network policy in a cluster policy database based on determining that the network policy is relevant to the cluster corresponding to the cluster policy server, obtain, by a PDP module that is separate from the cluster policy server, the network policy stored in the cluster policy database, and determine, by the PDP module, whether to implement the network policy based on a policy query received from a PEP module.

Additional aspects will be set forth in part in the description that follows and, in part, will be apparent from the description, or may be realized by practice of the presented embodiments of the disclosure.

BRIEF DESCRIPTION OF THE DRAWINGS

Features, advantages, and significance of exemplary embodiments of the disclosure will be described below with reference to the accompanying drawings, in which like signs denote like elements, and wherein.

DETAILED DESCRIPTION

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Figure 1:
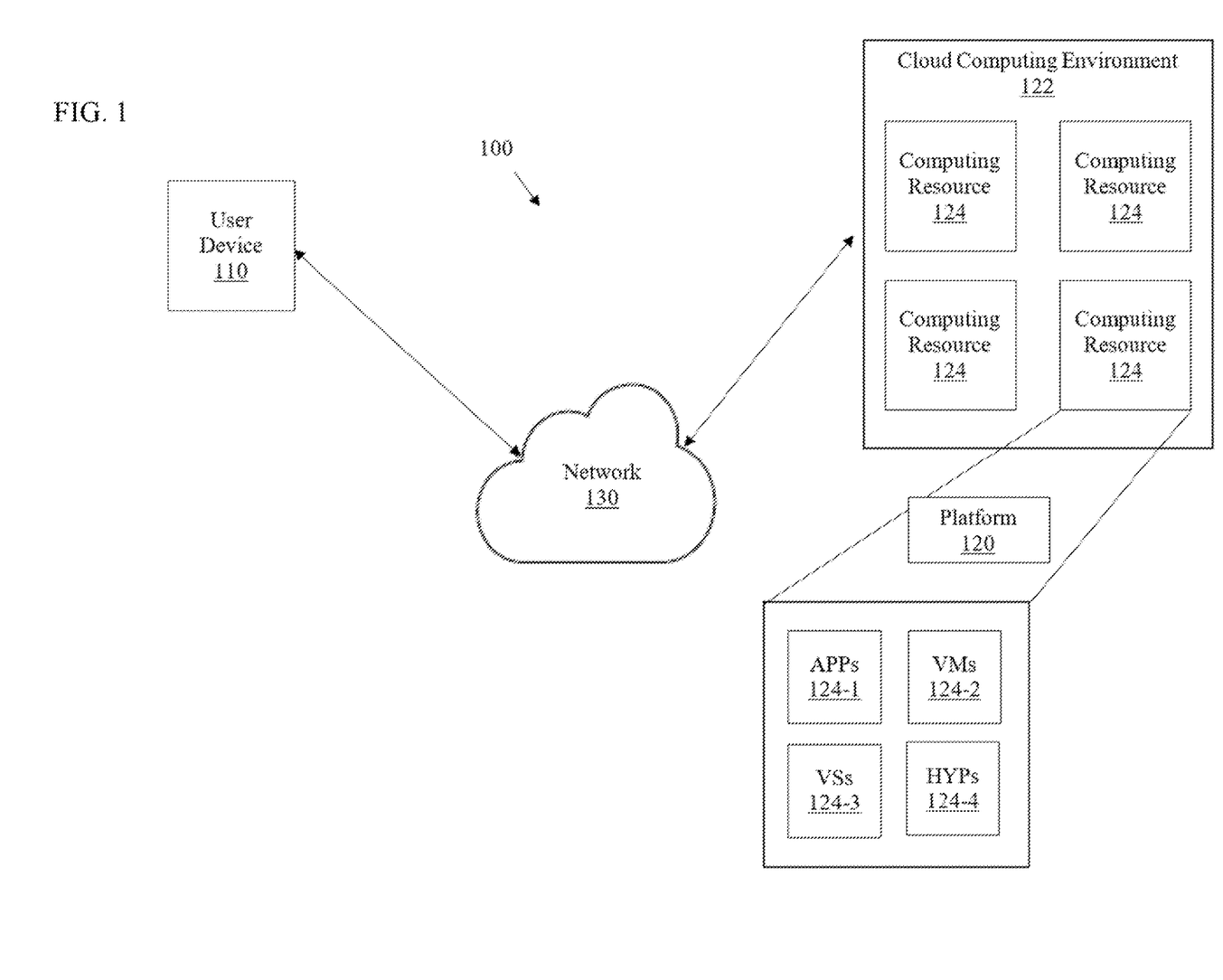
FIG. 1 is a diagram of an example environment in which systems and/or methods, described herein, may be implemented.

FIG. 1 is a diagram of an example environment 100 in which systems and/or methods, described herein, may be implemented. As shown in FIG. 1, environment 100 may include a user device 110, a platform 120, and a network 130. Devices of environment 100 may interconnect via wired connections, wireless connections, or a combination of wired and wireless connections. In embodiments, any of the functions and operations described with reference to FIG. 1 above may be performed by any combination of elements illustrated in FIG. 1.

User device 110 includes one or more devices capable of receiving, generating, storing, processing, and/or providing information associated with platform 120. For example, user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 110 may receive information from and/or transmit information to platform 120.

Platform 120 includes one or more devices capable of receiving, generating, storing, processing, and/or providing information. In some implementations, platform 120 may include a cloud server or a group of cloud servers. In some implementations, platform 120 may be designed to be modular such that certain software components may be swapped in or out depending on a particular need. As such, platform 120 may be easily and/or quickly reconfigured for different uses.

In some implementations, as shown, platform 120 may be hosted in cloud computing environment 122. Notably, while implementations described herein describe platform 120 as being hosted in cloud computing environment 122, in some implementations, platform 120 may not be cloud-based (i.e., may be implemented outside of a cloud computing environment) or may be partially cloud-based.

Cloud computing environment 122 includes an environment that hosts platform 120. Cloud computing environment 122 may provide computation, software, data access, storage, etc. services that do not require end-user (e.g., user device 110) knowledge of a physical location and configuration of system(s) and/or device(s) that hosts platform 120. As shown, cloud computing environment 122 may include a group of computing resources 124 (referred to collectively as "computing resources 124" and individually as "computing resource 124").

Computing resource 124 includes one or more personal computers, a cluster of computing devices, workstation computers, server devices, or other types of computation and/or communication devices. In some implementations, computing resource 124 may host platform 120. The cloud resources may include compute instances executing in computing resource 124, storage devices provided in computing resource 124, data transfer devices provided by computing resource 124, etc. In some implementations, computing resource 124 may communicate with other computing resources 124 via wired connections, wireless connections, or a combination of wired and wireless connections.

As further shown in FIG. 1, computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

Application 124-1 includes one or more software applications that may be provided to or accessed by user device 110. Application 124-1 may eliminate a need to install and execute the software applications on user device 110. For example, application 124-1 may include software associated with platform 120 and/or any other software capable of being provided via cloud computing environment 122. In some implementations, one application 124-1 may send/receive information to/from one or more other applications 124-1, via virtual machine 124-2.

Virtual machine 124-2 includes a software implementation of a machine (e.g., a computer) that executes programs like a physical machine. Virtual machine 124-2 may be either a system virtual machine or a process virtual machine, depending upon use and degree of correspondence to any real machine by virtual machine 124-2. A system virtual machine may provide a complete system platform that supports execution of a complete operating system ("OS"). A process virtual machine may execute a single program, and may support a single process. In some implementations, virtual machine 124-2 may execute on behalf of a user (e.g., user device 110), and may manage infrastructure of cloud computing environment 122, such as data management, synchronization, or long-duration data transfers.

Virtualized storage 124-3 includes one or more storage systems and/or one or more devices that use virtualization techniques within the storage systems or devices of computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 124-4 may provide hardware virtualization techniques that allow multiple operating systems (e.g., "guest operating systems") to execute concurrently on a host computer, such as computing resource 124. Hypervisor 124-4 may present a virtual operating platform to the guest operating systems, and may manage the execution of the guest operating systems. Multiple instances of a variety of operating systems may share virtualized hardware resources. In some embodiments, instead of hypervisor 124-4, container orchestration and runtime environment may provide virtualized OS resources to run to applications.

Network 130 includes one or more wired and/or wireless networks. For example, network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of environment 100 may perform one or more functions described as being performed by another set of devices of environment 100.

Figure 2:
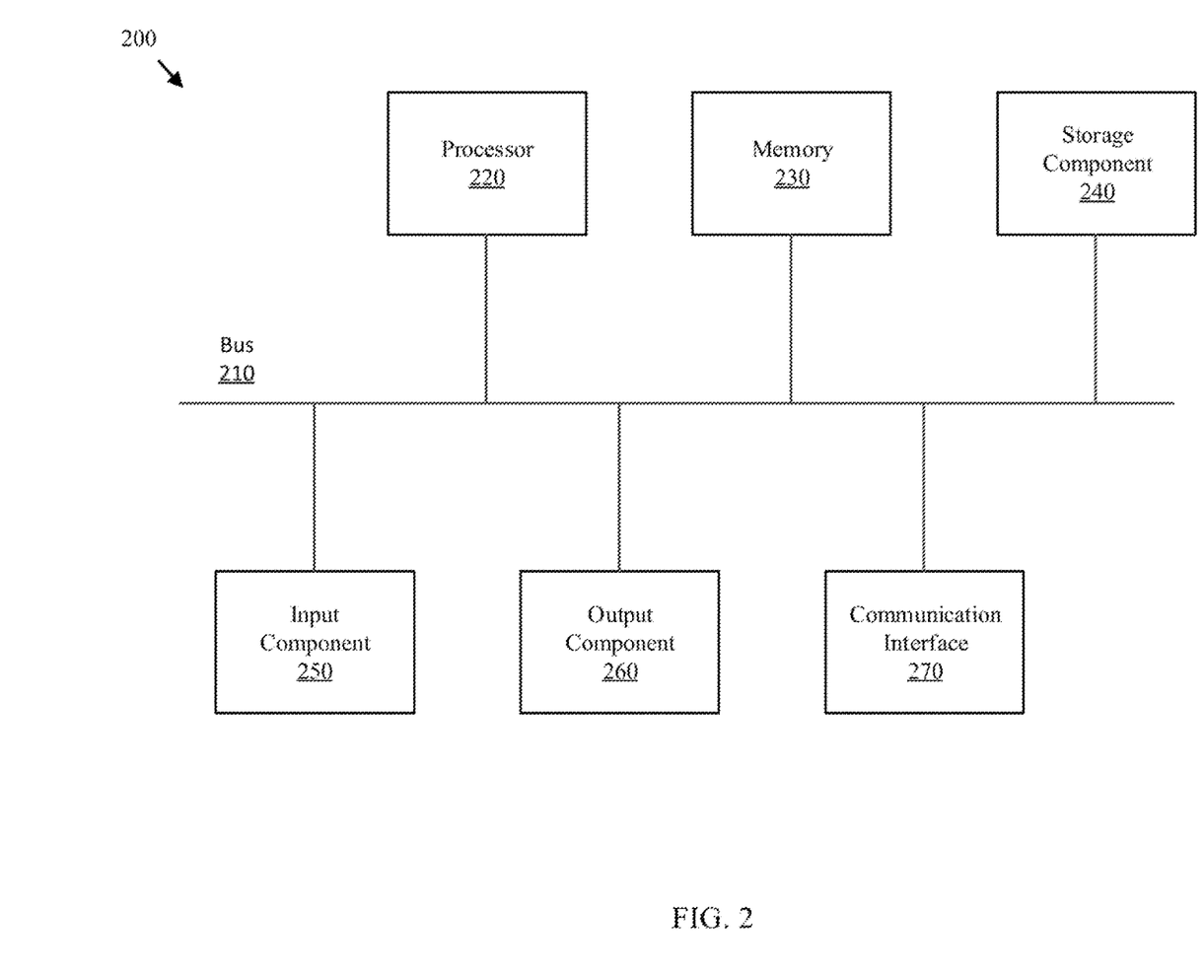
FIG. 2 is a diagram of example components of a device according to an embodiment.

FIG. 2 is a diagram of example components of a device 200. Device 200 may correspond to user device 110 and/or platform 120. As shown in FIG. 2, device 200 may include a bus 210, a processor 220, a memory 230, a storage component 240, an input component 250, an output component 260, and a communication interface 270.

Bus 210 includes a component that permits communication among the components of device 200. Processor 220 may be implemented in hardware, firmware, or a combination of hardware and software. Processor 220 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 220 includes one or more processors capable of being programmed to perform a function. Memory 230 includes a random access memory (RAM), a read only memory (ROM), and/or another type of dynamic or static storage device (e.g., a flash memory, a magnetic memory, and/or an optical memory) that stores information and/or instructions for use by processor 220.

Storage component 240 stores information and/or software related to the operation and use of device 200. For example, storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 250 includes a component that permits device 200 to receive information, such as via user input (e.g., a touch screen display, a keyboard, a keypad, a mouse, a button, a switch, and/or a microphone). Additionally, or alternatively, input component 250 may include a sensor for sensing information (e.g., a global positioning system (GPS) component, an accelerometer, a gyroscope, and/or an actuator). Output component 260 includes a component that provides output information from device 200 (e.g., a display, a speaker, and/or one or more light-emitting diodes (LEDs)).

Communication interface 270 includes a transceiver-like component (e.g., a transceiver and/or a separate receiver and transmitter) that enables device 200 to communicate with other devices, such as via a wired connection, a wireless connection, or a combination of wired and wireless connections. Communication interface 270 may permit device 200 to receive information from another device and/or provide information to another device. For example, communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

Device 200 may perform one or more processes described herein. Device 200 may perform these processes in response to processor 220 executing software instructions stored by a non-transitory computer-readable medium, such as memory 230 and/or storage component 240. A computer-readable medium is defined herein as a non-transitory memory device. A memory device includes memory space within a single physical storage device or memory space spread across multiple physical storage devices.

Software instructions may be read into memory 230 and/or storage component 240 from another computer-readable medium or from another device via communication interface 270. When executed, software instructions stored in memory 230 and/or storage component 240 may cause processor 220 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

A software or hardware module which makes a decision and enforces the decision may offload the decision-making process to another sub-module. Decisions are made using several policies and these policies are either generated or coded by expert system engineers. The sub-module which uses the policies to make a decision is referred to as a policy decision point (PDP) (e.g., a PDP module). The module which offloads the decision to the PDP but is responsible for enforcing the decision is referred to as a policy enforcement point (PEP)(e.g., a PEP module). The PDP and PEP represent a pattern where the decision making and enforcement are decoupled for better maintenance, scaling and performance of the modules.

In a telecommunication system, the policy decisions may be enforced by PEPs at different components within the system. The components may be hosted on different virtual/physical machines and use one or more network interfaces to communicate to each other. The PDPs may require the necessary policies and supplementary data (referred to as "data") to make a decision about a decision query coming from a PEP. The decision query may be, for example, an authorization or admission control of an incoming request to access/modify a resource, usage of a particular network interface, granting permissions for a user to access a device, allowing application to application communication, etc.

Provided are a method and system for a hierarchical policy-based decision framework for cloud-native telecommunication systems. The hierarchical structure may be configured such that a central policy server is separate (i.e., for example, part of a different location or a different set of computing devices) from a distribution server, a cluster policy server, and/or PDPs and PEPs. Thus, the hierarchical structure provides certain advantages, such as improved decision-making performance, independent scaling of PDPs and PEPs, enabling different security controls for PDPs and PEPs (security fencing, role based access control (RBAC), etc.), dynamic and localized updating of local PDP data, which is used for policy-based decision making based on the current state of PEP and its dependencies, etc.

The systems and methods provide a functional separation of PEP and PDP, which enables scaling up/down of the PEP and PDP microservices independently, providing system resiliency, high availability, and automatic scaling. The provided hierarchy of decision points reduces the load on a central policy storage/engine and keeps the policy queries local to the cluster or to the host/microservice where the decision has to be made, thereby reducing the network traffic for policy based decision making. Furthermore, by co-locating PDP and PEP with zero network hops, the systems and methods may provide faster and time-predictable decision making. Since the distributed cloud native nature of the PDPs and their localized associated with PEPs, the policy decisions may be made by taking up-to-date and current state information of the PEN and their dependencies into consideration.

Accordingly, embodiments of the disclosure provide performance improvement in decision making, independent scaling of PDPs and PEPs, enabled different security controls for PDPs and PEPs (e.g., security fencing, RBAC, etc.), and dynamic and localized updating of local PDP data, which may be used for policy-based decision making, based on a current state of a PEP and its dependencies.

Figure 3:
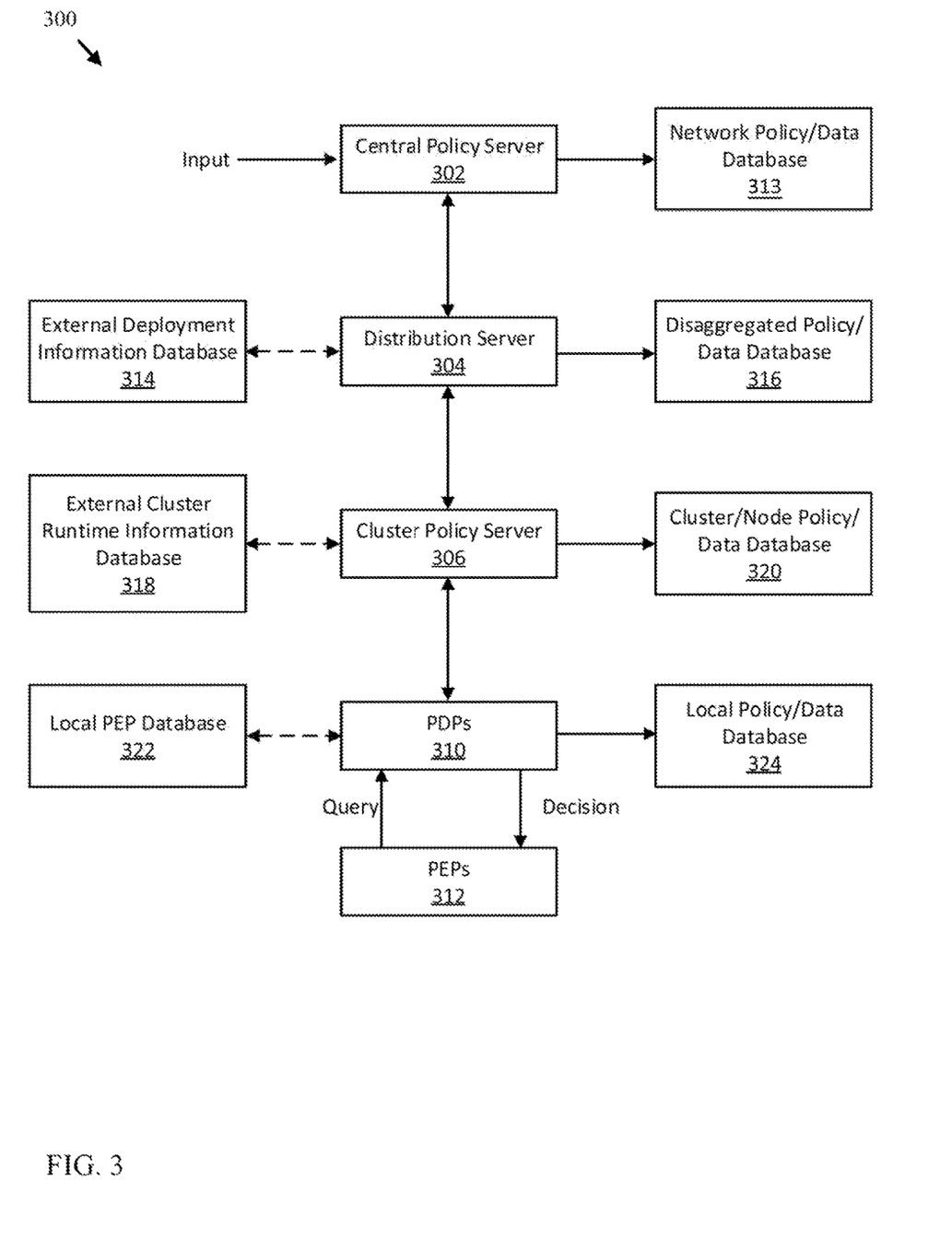
FIG. 3 is a diagram of a hierarchical telecommunication system, according to an embodiment.

FIG. 3 is a diagram of a hierarchical telecommunication system, according to an embodiment. The system 300 may include a central policy server 302, a distribution server 304, a cluster policy server 306, PDPs 310 and PEPs 312 that correspond to the PDPs 310. The distribution server 304 may be configured as a topology-aware/PDP-type-aware packaging and distribution server. The central policy server 302, distribution server 304 and cluster policy server 306 may be located in the same or different locations. Each cluster may include a number of PDPs from the PDPs 310, as well as the respective corresponding PEPs from the PEPs 312. In some embodiments, the system 300 may include a cluster policy server for each cluster, or include a cluster policy server configured for multiple clusters. Furthermore, one PEP may correspond to multiple PDPs, one PEP may correspond to one PDP, and one PDP may correspond to multiple PEPs.

As will be described in detail below, system engineers may provide inputs to the central policy server 302, and the central policy server 302 may generate updates to a policy or implement a new policy based on the inputs and store the policy and data in the network policy/data database 313. The distribution server 304 may utilize external deployment information database 314 (i.e., used on policy templates to generate an improved policy) to generate disaggregated policies and data, and store the policies and data in the disaggregated policies/data database 316. The cluster policy server 306 may utilize external cluster runtime information database 318 to generate cluster/node policies and data, and store the cluster/node policies and data in the cluster/node policy/data database 320. The PDP 310 may utilize local PDP data from a local PEP database 322 and store local policies and data in the local policy/data database 324. Due to the hierarchical structure of the system 300, the external deployment information 314, the external cluster runtime information 318 and the local PDP database 322 may include real-time and runtime parameters that are input to the system 300 for dynamic and accurate policy decision making and enforcement.

The base policy and data information independent of the topology or cluster information may be defined in the central policy server 302. The central policy server 302 may encompass and store policy and data for the entire network of PEPs.

The policy and data from the central policy server 302 may then be processed by the distribution server 304 to generate disaggregated PDP specific packages containing policy and data. The policy and data generated at the distribution server 304 may be a result of addition/deletion of central policies and data. Also, the deployment specific information may be taken into consideration by the distribution server 304 while generating/storing the new policy and data. The deployment specific information may include a deployment location (e.g., country, city, etc.), cloud infrastructure provider information, security control information specific to the customers that the applications are serving, deployment specific access control lists, time interval specific access for a specific deployment (including an auto expiration of access in some embodiments), etc.

The cluster policy server 306, which may be hosted in each cluster of the network, may be aware of the runtime environment of the cluster and monitors the cluster for different events. The cluster policy server 306 may utilize the policy and data from the distribution server 304 to generate cluster-specific policies and data, which are tuned towards the specific cluster and its runtime. In other words, the cluster policy server 306 may utilize contextual information specific to the cluster and generate a policy relevant to the cluster. For example, the cluster policy server 306 may utilize information of current running microservices in the cluster, load on the cluster, historical events of the cluster, data format conversions needed, policy format conversions needed, etc., to generate a cluster level policy and data information and to store the generated cluster level policy and data information in the cluster level storage 320.

The PDP 310 may be utilized in proximity to the PEPs 312. The PEPs 312 may utilize decisions from the PDP 310 and then enforce the decisions. The cluster policy and data are pulled by different PDP during their initialization and loaded dynamically when there is an upstream policy and data change, into their fast access cache. The PDP 310 may also update the cache with any data from the PEP that it is serving.

The PEP 312 may query a corresponding PDP for decision making. The PDP may use its cached policy and data, perform the policy rule checking, and output the decision to the PEP 312, which the PEP 312 enforces. In one embodiment, the cloud-native telecommunication system may include several PEP and PDP pairs.

Thus, the system as shown in FIG. 3 does not require all information to be sent from an endpoint all the way to the server to generate disaggregated policies (i.e., a singular server device does not have to perform all the steps, allowing updates and policy decisions to occur in real-time or at least semi-real time). This reduces time delays in processing updates and policy decisions, while reducing the amount of data that needs to be sent within the system to perform the updates and policy decisions.

Figure 4:
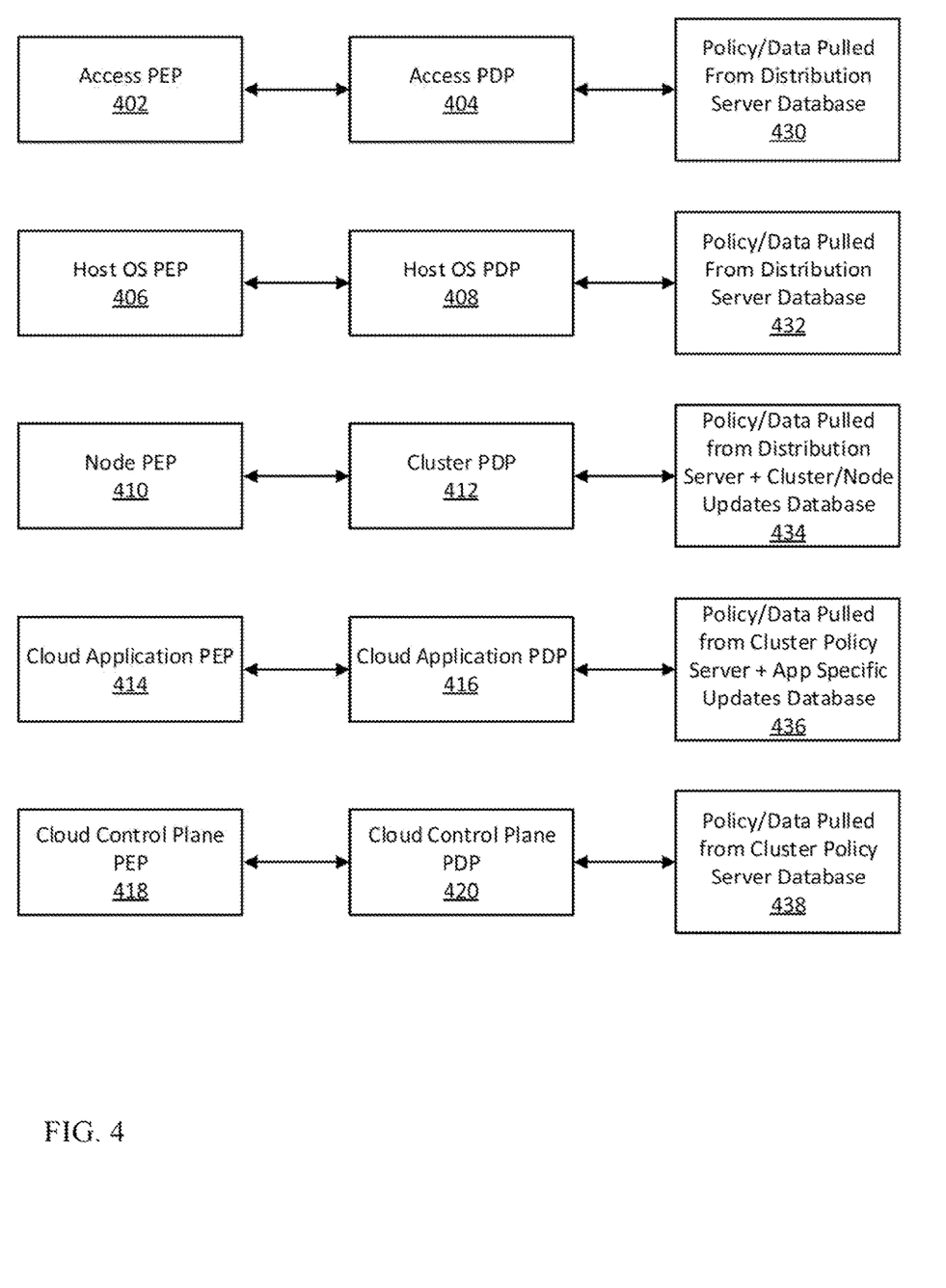
FIG. 4 is a diagram of example policy enforcement points (PEPs) and policy decision points (PDPs), according to an embodiment.

FIG. 4 is a diagram of example PEPs and PDPs, according to an embodiment. For example, the system may include an access PEP 402 and a corresponding access PDP 404 (e.g., an application), a host operating system (OS) PEP 406 and a corresponding host OS PDP 408 (e.g., an OS service), a node PEP 410 and a cluster PDP 412 corresponding to the node PEP 410, a cloud application PEP 414 and a corresponding cloud application PDP 416 (e.g., a sidecar), and a cloud control plane PEP 418 and a corresponding cloud control plane PDP 420 (e.g., a library). The system may include various storages/databases 430-438 for storing the policy and data corresponding to the respective PDPs.

In some embodiments, the access PDP 404 may provide authorization decisions for accessing resources on other systems and act as an authorization gateway. The access PDP 404 may obtain/store policies and data information pulled from the distribution server with database 430.

The host OS PEP 406 may provide authorization for configuring/modifying the OS and its parameters. The hose OS PDP 408 may obtain/store policies and data pulled from the distribution server with database 432. The host OS PEP 406 may also leverage a cluster PDP 412 since the policies and data needed by the host OS PEP 406 may also be made available via the cluster PDP 412. In the case of a fault in the host OS PDP 408 (e.g., a primary PDP), the cluster PDP 412 (e.g., a secondary PDP) may provide availability for policies.

The node PEP 410 may make decisions on behalf of applications running on the specific node in the cluster, and query the cluster PDP 412, which may be running as a Kubernetes DaemonSet for its decision making procedures. The cluster PDP 412 may obtain/store policies and data pulled from the distribution server as well as optional cluster/node specific updates with database 434.

The cloud application PEP 414 may reside in a POD/container and may use the cloud application PDP 416 or rely on the cluster PDP 412 when there are no application-specific policies/data needed for the decision making procedures. The cloud application PDP 416 may obtain/store policies and data pulled from the cluster policy server, as well as optional application specific updates with database 436.

The cloud control plane PEP 418 (e.g., a Kubernetes gatekeeper) may utilize an integrated PDP (i.e., the cloud control plane PDP 420), which may be configured with the control plane policies/data retrieved from the cluster policy server (e.g., the cluster policy server 306). The cloud control plane PDP may obtain/store policies and data pulled from the cluster policy server with database 438.

Figure 5:
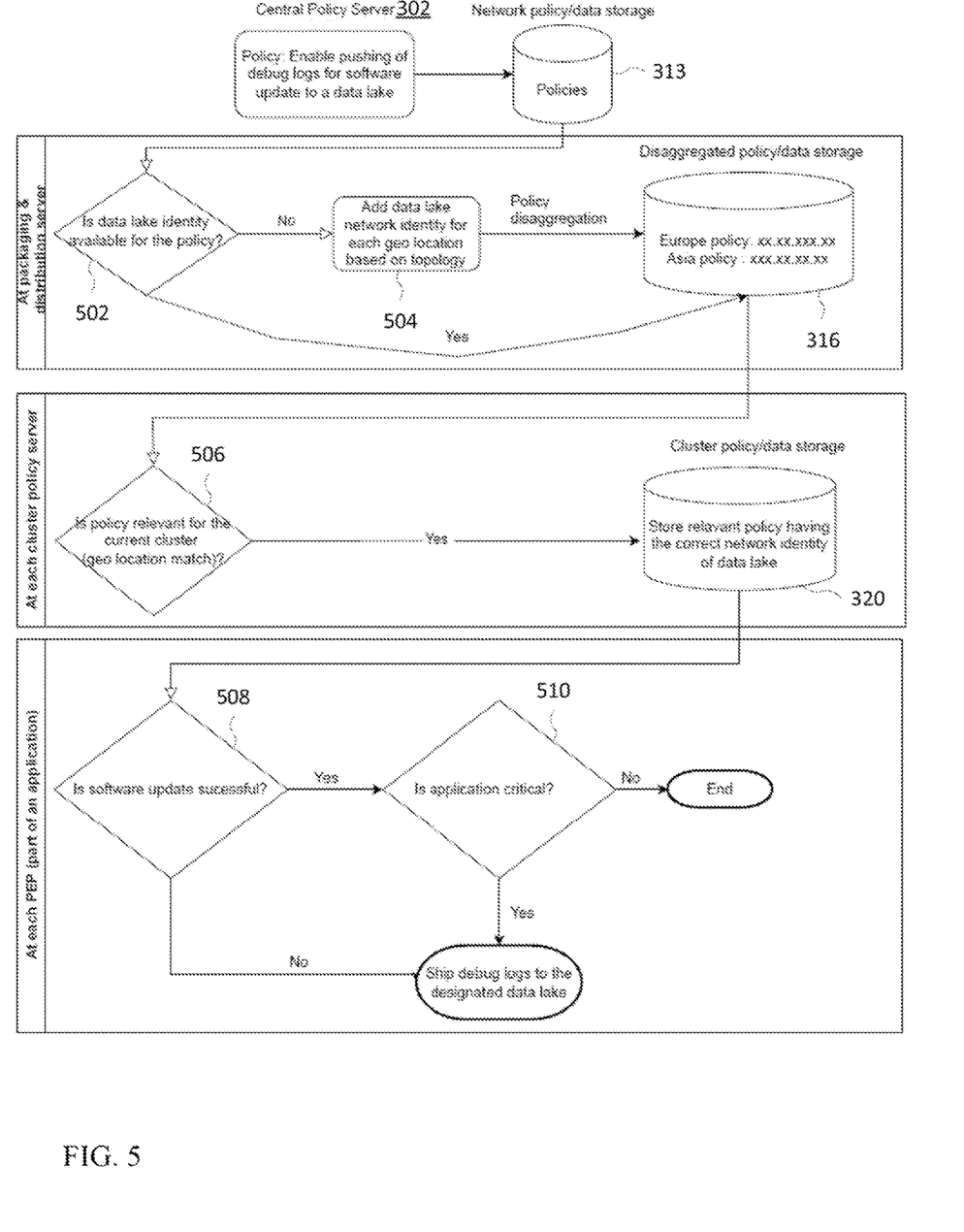
FIG. 5 is a flow diagram of an example policy decision making process, according to an embodiment.

FIG. 5 is a flow diagram of an example policy decision making process, according to an embodiment. The use case depicted is one for a policy to push debug logs of a critical or non-critical application for its last software, to a data lake. The example policy defined in FIG. 5 may be related to the upload of software update logs when there is a software update failure or the software update is performed on a critical application (i.e., policy example related to software updates). In some embodiments, other use cases may include authorizing a list of users for a particular duration to allow access to a resource for maintenance, providing a whitelist of image repositories from which a software can be downloaded by a Kubernetes system, allowing enablement of verbose tracing of a containerized application by privileged support personnel, applying security and monitoring/audit related policies that are relevant to the region where a cloud cluster is deployed, etc. That is, the system may determine whether the use cases are required when determining whether to implement a network policy. The operations shown in FIG. 5 will be described with reference to corresponding components in FIG. 3. The central policy server 302 may receive a policy of "enable pushing of debug logs for software update to a data lake" as an input, and then store the received policy in the network policy/data storage 313. The distribution server 304 may retrieve the stored policy from the network policy/data storage 313, and in operation 502, determine whether the data lake identity is available for the policy. If the data lake identity is not available, in operation 504, the distribution server 304 may add the data lake network identity for each geolocation based on topology. The topology and data lake identity information may be obtained with real time retrieval by the distribution server 304 from the external deployment information database 314. The distribution server 304 may then perform policy disaggregation and store the policy in the disaggregated policy/data storage 316. If the data lake identity is available, then the distribution server 304 may disaggregate the policy and store the disaggregated policy in the disaggregated policy/data storage 316 while omitting operation 504. Disaggregation, for example, may be implemented by separating out sub-data lakes from the main data lake. In the example shown in FIG. 5, the data lake may include worldwide locations, and the policy may be disaggregated into a policy for a data lake for a first region (i.e., Europe) and a policy for a data lake for a second region (i.e., Asia).

The cluster policy server 306 may retrieve the disaggregated policy from the disaggregated policy/data storage 320 and, in operation 506, determine whether the policy is relevant for the current cluster (e.g., determine whether the current geolocation matches). The cluster policy server 306 may retrieve the geolocation information from the external cluster runtime information database 318. If the policy is relevant for the current cluster, the cluster policy server 306 may store the relevant policy having the correct network identity of the data lake in the cluster policy/data storage 320. If the policy is not relevant, then no further operations are taken.

A PDP 310 may retrieve the policy stored in the cluster policy/data storage 320 and then determine, in operation 508, with a corresponding PEP 312, whether a software update was successful. If the software update is not successful, the PDP 310 may ship debug logs to the designated data lake (e.g., the PDP 310 may decide to implement the policy). If the software update is successful, in operation 510, the PDP 310 may determine whether the application is critical. The PDP 310 may determine if the application is critical based on real time retrieval of corresponding data from the local PEP database 322. If the application is critical, the PDP 310 may ship debug logs to the designated data lake (e.g., the PDP 310 may decide to implement the policy). If the application is not critical, the overall flow may end (e.g., the PDP 310 may decide to not implement the policy).

Figure 6:
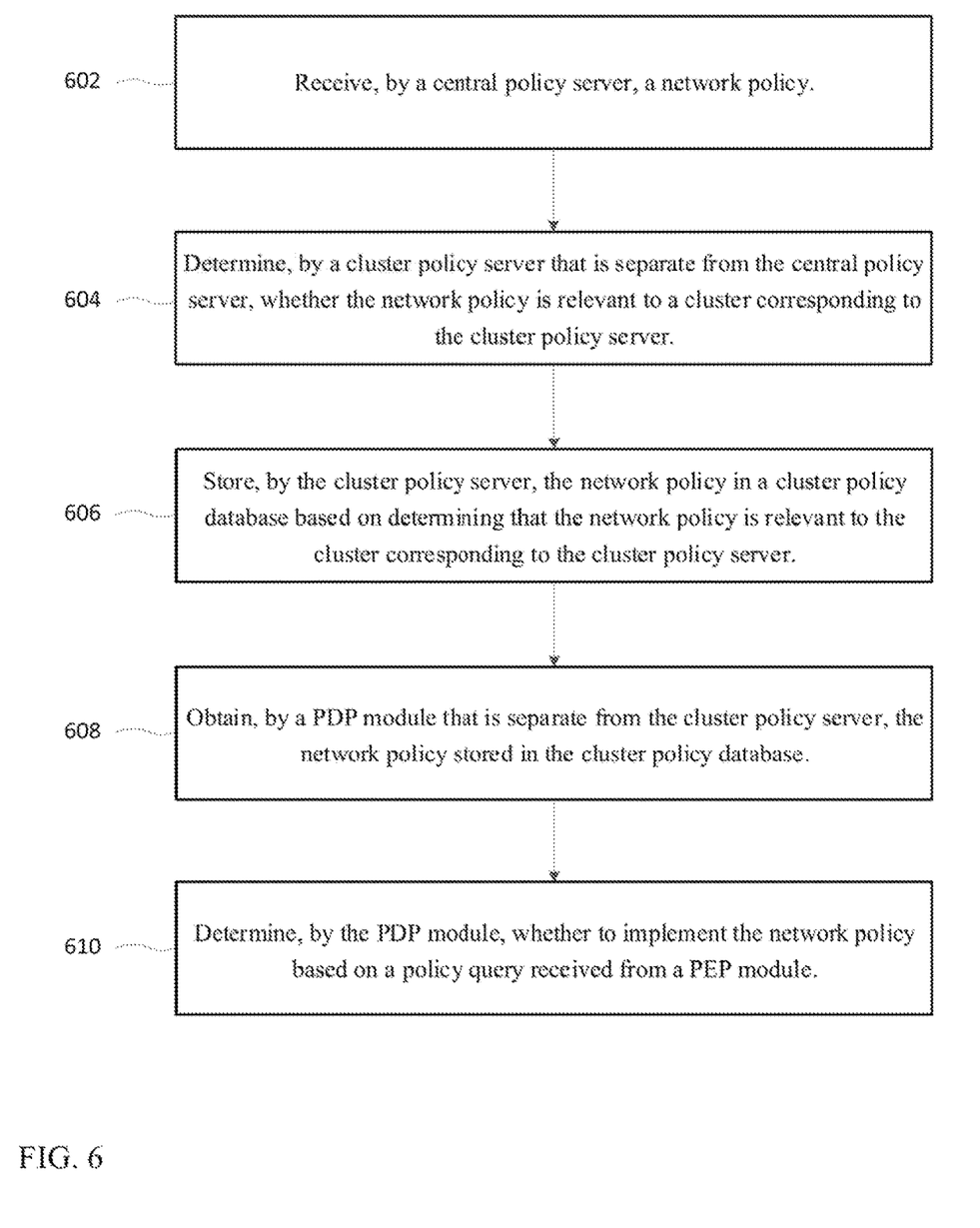
FIG. 6 is a flowchart of a method of policy decision making, according to an embodiment.

FIG. 6 is a flowchart of a method of policy decision making, according to an embodiment. In operation 602, the system may receive, by a central policy server, a network policy. In operation 604, the system may determine, by a cluster policy server that is separate from the central policy server, whether the network policy is relevant to a cluster corresponding to the cluster policy server. In operation 606, the system may store, by the cluster policy server, the network policy in a cluster policy database based on determining that the network policy is relevant to the cluster corresponding to the cluster policy server. In operation 608, the system may obtain, by a PDP module that is separate from the cluster policy server, the network policy stored in the cluster policy database. In operation 610, the system may determine, by the PDP module, whether to implement the network policy based on a policy query received from a PEP module.

In embodiments, any one of the operations or processes of FIGS. 3-6 may be implemented by or using any one of the elements illustrated in FIGS. 1 and 2.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method of policy decision making, comprising:
receiving, by a central policy server, a network policy;
determining, by a cluster policy server, whether the network policy is relevant to a cluster corresponding to the cluster policy server;
generating, by the cluster policy server and based on the network policy, a cluster policy based on determining that the network policy is relevant to the cluster corresponding to the cluster policy server;
obtaining, by a policy decision point (PDP) module, the cluster policy from the cluster policy server; and
determining, by the PDP module, whether to implement the cluster policy based on a policy query received from a policy enforcement point (PEP) module.

2. The method of claim 1, wherein determining whether to implement the cluster policy comprises one or more of:
determining whether a software update of an application corresponding to the PEP module is required;
determining whether an access authorization of a list of users to a network resource is required;
determining whether a provision of a whitelist of image repositories from which a software is downloadable is required;
determining whether verbose tracing of a containerized application is required; and
determining whether an application of security and monitoring policies is required.

3. The method of claim 1, wherein determining whether to implement the cluster policy further comprises:
determining whether a software update of an application corresponding to the PEP module is successful;
implementing the cluster policy based on the software update not being successful;
based on determining that the software update is successful, determining whether the application corresponding to the PEP module is critical; and
implementing the cluster policy based on determining that the application corresponding to the PEP module is critical.

4. The method of claim 3, wherein the application corresponding to the PEP module is determined to be critical based on real time retrieval of corresponding data from a PEP database that is local to the PDP module.

5. The method of claim 1, wherein the generating the cluster policy comprises:
generating, by a distribution server that is separate from the central policy server, at least one disaggregated policy based on the network policy;
storing, by the distribution server, the disaggregated policy in a disaggregated policy database;
generating, by the cluster policy server that is separate from the distribution server, the cluster policy based on the disaggregated policy; and
storing, by the cluster policy server, the cluster policy in a cluster policy database.

6. The method of claim 5, further comprising:
determining, by the distribution server, whether identity information and topology information for the network is available; and
based on the identity information and/or the topology information being unavailable, adding, by the distribution server, the identity information and/or the topology information to the network policy based on real time retrieval of the identity information and the topology information from an external deployment information database.

7. The method of claim 1, wherein the PDP module comprises an access PDP module configured to provide authorization decisions to provide access to external components.

8. A system for policy decision making, comprising:
a central policy server configured to receive a network policy;
a cluster policy server configured to:
determine whether the network policy is relevant to a cluster corresponding to the cluster policy server;
generate, based on the network policy, a cluster policy based on determining that the network policy is relevant to the cluster corresponding to the cluster policy server; and
a policy decision point (PDP) module configured to:
obtain, from the cluster policy server, the cluster policy; and determine whether to implement the cluster policy based on a policy query received from a policy enforcement point (PEP) module.

9. The system of claim 8, wherein the PDP module is configured to determine whether to implement the cluster policy by one or more of:
   determining whether a software update of an application corresponding to the PEP module is required;
   determining whether an access authorization of a list of users to a network resource is required;
   determining whether a provision of a whitelist of image repositories from which a software is downloadable is required;
   determining whether verbose tracing of a containerized application is required; and
   determining whether an application of security and monitoring policies is required.

10. The system of claim 8, wherein the PDP module is configured to determine whether to implement the cluster policy by:
   determining whether a software update of an application corresponding to the PEP module is successful;
   implementing the cluster policy based on the software update not being successful;
   based on determining that the software update is successful, determining whether the application corresponding to the PEP module is critical; and
   implementing the cluster policy based on determining that the application corresponding to the PEP module is critical.

11. The system of claim 10, wherein the application corresponding to the PEP module is determined to be critical based on real time retrieval of corresponding data from a PEP database that is local to the PDP module.

12. The system of claim 8, further comprising a distribution server that is separate from the central policy server and is configured to:
   generate at least one disaggregated policy based on the network policy, and
   store the at least one disaggregated policy in a disaggregated policy database,
   wherein the cluster policy server is separate from the distribution server and is configured to generate the cluster policy by:
      generating the cluster policy based on the disaggregated policy; and
      storing, by the cluster policy server, the cluster policy in a cluster policy database.

13. The system of claim 12, wherein the distribution server is further configured to:
   determine, by the distribution server, whether identity information and topology information for the network is available; and
   based on the identity information and/or the topology information being unavailable, add, by the distribution server, the identity information and/or the topology information to the network policy based on real time retrieval of the identity information and the topology information from an external deployment information database.

14. The system of claim 8, wherein the PDP module comprises an access PDP module configured to provide authorization decisions to provide access to external components.

15. A non-transitory computer-readable storage medium storing instructions that, when executed by at least one processor, cause the at least one processor to:
   receive, by a central policy server, a network policy;
   determine, by a cluster policy server, whether the network policy is relevant to a cluster corresponding to the cluster policy server;
   generate, by the cluster policy server and based on the network policy, a cluster policy based on determining that the network policy is relevant to the cluster corresponding to the cluster policy server;
   obtain, by a policy decision point (PDP) module, the cluster policy from the cluster policy server; and
   determine, by the PDP module, whether to implement the cluster policy based on a policy query received from a policy enforcement point (PEP) module.

16. The storage medium of claim 15, wherein the instructions, when executed, cause the at least one processor to determine whether to implement the cluster policy by one or more of:
   determining whether a software update of an application corresponding to the PEP module is required;
   determining whether an access authorization of a list of users to a network resource is required;
   determining whether a provision of a whitelist of image repositories from which a software is downloadable is required;
   determining whether verbose tracing of a containerized application is required; and
   determining whether an application of security and monitoring policies is required.

17. The storage medium of claim 15, wherein the instructions, when executed, cause the at least one processor to determine whether to implement the cluster policy by:
   determining whether a software update of an application corresponding to the PEP module is successful;
   implementing the cluster policy based on the software update not being successful;
   based on determining that the software update is successful, determining whether the application corresponding to the PEP module is critical; and
   implementing the cluster policy based on determining that the application corresponding to the PEP module is critical.

18. The storage medium of claim 17, wherein the application corresponding to the PEP module is determined to be critical based on real time retrieval of corresponding data from a PEP database that is local to the PDP module.

19. The storage medium of claim 15, wherein the instructions, when executed, cause the at least one processor to generate the cluster policy by:
   generating, by a distribution server that is separate from the central policy server, at least one disaggregated policy based on the network policy;
   storing, by the distribution server, the at least one disaggregated policy in a disaggregated policy database;
   generating, by the cluster policy server that is separate from the distribution server, the cluster policy based on the disaggregated policy; and
   storing, by the cluster policy server, the cluster policy in a cluster policy database.

20. The storage medium of claim 19, wherein the instructions, when executed, cause the at least one processor to:
   determine, by the distribution server, whether identity information and topology information for the network is available; and
   based on the identity information and/or the topology information being unavailable, add, by the distribution server, the identity information and/or the topology information to the network policy based on real time retrieval of the identity information and the topology information from an external deployment information database.

\* \* \* \* \*